United States Patent [19]
Reed

[11] Patent Number: 4,883,432
[45] Date of Patent: Nov. 28, 1989

[54] MODULAR JACK YOKE

[75] Inventor: Brian E. Reed, New Hartford, Conn.

[73] Assignee: The Siemon Company, Watertown, Conn.

[21] Appl. No.: 291,107

[22] Filed: Dec. 28, 1988

[51] Int. Cl.$^4$ ............................................. H01R 13/74
[52] U.S. Cl. .................................. 439/553; 248/27.3; 439/540
[58] Field of Search ............... 439/553, 557, 540, 567, 439/554–556, 716, 552, 569, 571, 572; 248/27.3, 221.4

[56] References Cited

U.S. PATENT DOCUMENTS

| | | | |
|---|---|---|---|
| 3,559,813 | 2/1971 | Sosinski | 439/716 |
| 3,866,868 | 2/1975 | Fish et al. | 248/27.3 |
| 4,046,449 | 9/1977 | Ranzanigo | 439/553 |
| 4,103,985 | 8/1978 | Krolak et al. | 439/553 |
| 4,684,198 | 8/1987 | Becraft et al. | 439/638 |

FOREIGN PATENT DOCUMENTS

| | | | |
|---|---|---|---|
| 2346783 | 6/1974 | Fed. Rep. of Germany | 439/716 |
| 2165102 | 4/1986 | United Kingdom | 439/571 |

Primary Examiner—Gary F. Paumen
Attorney, Agent, or Firm—Fishman, Dionne & Cantor

[57] ABSTRACT

A modular jack yoke for use in mounting modular jacks to telephone terminal blocks and the like is presented. The yoke is a rectangular unit of solid construction with apertures at both ends to enable mounting of the yoke to a terminal block and bracket assembly, panel or other flat mounting surface. Located between the mounting apertures are two open areas for receiving modular jacks. The open areas include structure for mating the yoke with modular jacks. This mating structure effects snap locking of the modular jacks into position on the modular jack yoke.

10 Claims, 1 Drawing Sheet

MODULAR JACK YOKE

BACKGROUND OF THE INVENTION

This invention relates generally to terminal blocks used in the telephonic and related industries. More particularly, this invention relates to a new and improved support structure or yoke for mounting modular jacks onto a terminal block and bracket assembly.

Modular jacks are used extensively in the telephone and electronics industry. The modular jack provides a uniform method of access to telephone and electronic circuitry. Recently, modular jacks have found increasing use in conjunction with telephone and related terminal blocks, including the well known type 66 terminal block. The modular jack provides easy access to the terminal block resulting in faster repairs and installations. The use of the modular jack with the terminal block or other surface requires the modular jack to be mounted to the block supporting structure.

Telephone terminal blocks are typically used in conjunction with a snap-on mounting bracket. Such an assembly is shown, for example, in U.S. Pat. No. Re. 31,714, which is assigned to the assignee hereof and incorporated herein by reference. The bracket used in this assembly includes spaced openings for receiving unitary electrical connectors. Small threaded holes laterally displaced from each opening are used to threadibly fasten the connectors to the bracket. These unitary connectors are then hardwired to the terminals in the terminal block.

In addition to unitary connectors, the spaced openings in the bracket assembly also receive one or more modular jacks which are also hardwired to the terminals. Presently, modular jacks are connected to the bracket assembly with the use of a two piece frame that holds the jack when it is screwed to the terminal block. This frame is awkward and time consuming to use. The modular jacks must be slid into one piece of the frame and held in place on the terminal block. Next, the other piece of the frame is positioned in place and then each frame piece must be screwed down to the terminal block bracket. Since the two-piece, slide-in yoke requires support walls on each side of each jack, it was designed to acommodate four narrow jacks that are only available in 2, 4 and 6 wire versions. Although these small jacks are available in the wider housing used for the eight wire jack, they could not be used because their increased width made it impossible to mount more than 3 jacks per bracket opening with the same support means. These combined features necessitate a new and improved yoke that could accommodate up to four jacks, any style, for mounting on a single bracket opening. Such a device would alleviate the need of stocking multiple yoke components, reduce manufacturing and assembly costs and serve market demands for other connecting hardware available in the same housing shape.

SUMMARY OF THE INVENTION

The above-discussed and other problems and deficiencies of the prior art are overcome or alleviated by the improved apparatus of the present invention for supporting and mounting modular jacks to a terminal block and bracket assembly or other mounting surface. In accordance with the present invention, this supporting and mounting assembly or yoke comprises a rectangular unit of solid construction with apertures at both ends to enable mounting of the yoke to a terminal block and bracket assembly or other flat supporting structure. Located between the mounting apertures are two open areas for receiving modular jacks. The open areas include a structure for mating the yoke with modular jacks. This structure effects snap locking of the modular jacks into position on the modular jack yoke.

The modular jacks are mated to the yoke by spaced stops and hooks. The stops and hooks have a preselected configuration for alignment with corresponding stops on the modular jacks. The modular jack effects a firm snap locking engagement to the stops and hooks and is thereby prevented from either horizontal or vertical movement. The hook is ramped which permits the modular jack to be snapped into place in one easy action.

The modular jack that is used in conjunction with the modular jack yoke of the present invention is well known and comercially available; and may be of either a 2, 4, 6 or 8 wire design. This allows for a multitude of products to be manufactured with any size modular jack while only requiring the inventory of one size yoke component.

Another benefit of the present invention is that the outer surface of the modular jack yoke is flush with the modular jacks when the modular jacks are positioned in the modular jack yoke. This results in a space savings and less chance of accidental disruption.

When mounting the yoke on a block and bracket, the modular jacks may be wired to either the terminal block tails using wrapped wire or by accessing the IDC clips on the front of the blocks through the egress channels provided about each jack. The channels are defined by the bottom edge of the connecting block and the top of the yoke. Wires exiting the jacks are kept separate for wiring purposes by the support tabs that extend up to the block from the top of the yoke between each jack. In addition to the four counter-sunk slots provided for mounting a wide variety of brackets, two additional holes are available for mounting the yoke to the inside surface of panel assemblies with self tapping screws or rivets.

The above discussed and other features and advantages of the present invention will be apparent to and understood from the following detailed description of the drawings.

BRIEF DESCRIPTION OF THE DRAWINGS

Referring now to the drawings, wherein like elements are numbered alike in the several FIGURES.

DETAILED DESCRIPTION OF THE INVENTION

Figure 1:
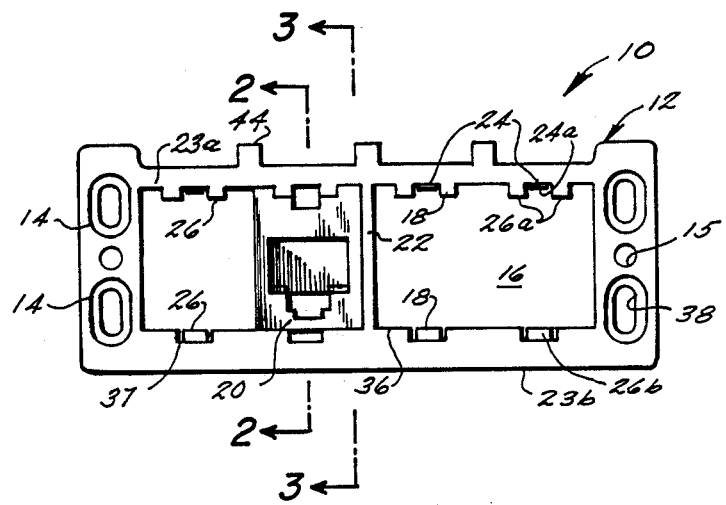
FIG. 1 is a front elevation view of a modular jack yoke having a modular jack mounted thereon in accordance with the present invention.
Figure 2:
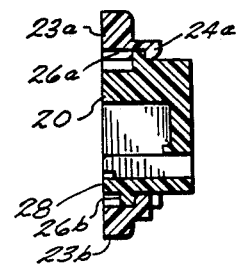
FIG. 2 is a side elevation view along the line 1—1 of FIG. 1.
Figure 3:
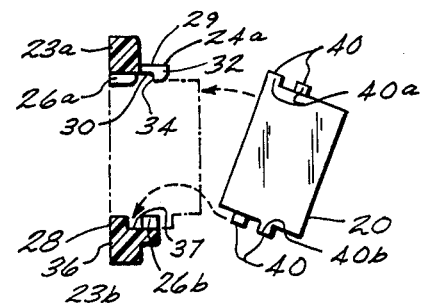
FIG. 3 is a side elevation view along the line 2—2 of FIG. 1.
Figure 4:
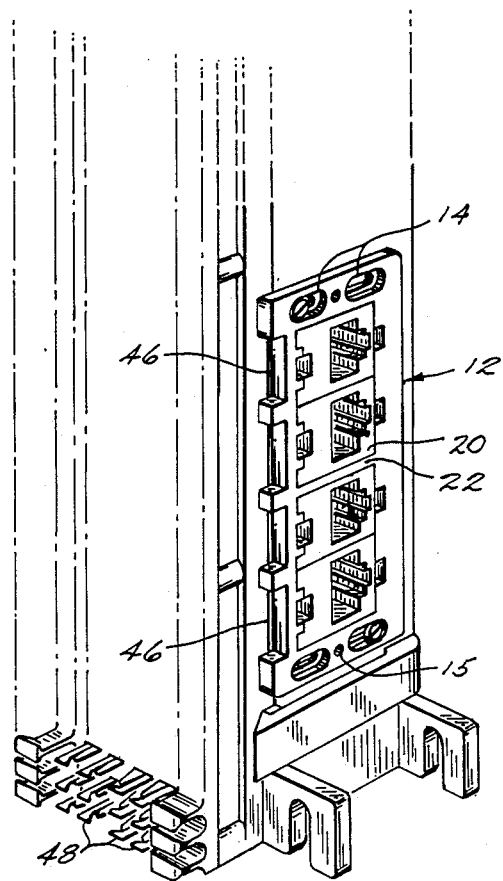
FIG. 4 is a front perspective view of the modular jack yoke of FIG. 1 mounted on a block and bracket assembly and having four modular jacks mounted thereto.

Referring first to FIGS. 1–3, a modular jack yoke is shown generally at 10. Modular jack yoke 10 has an integral one-piece body 12. Body 12 includes a terminal block mounting means 14, panel mounting means 15, a pair of spaced modular jack openings 16, and modular jack attachment means 18. Modular jacks 20 are received in openings 16 and held in place by attachment means 18. Yoke 10 is subsequently mounted to a terminal block 17 and bracket 19 (FIG. 4).

Body 12 of yoke 10 has rectangular dimensions. Openings 16 in body 12 ar also rectangular with the length dimension of opening 16 being parallel with the length dimension of body 12. The width dimension of opening 16 is perpendicular to the length dimension of body 12 and is substantially equl to the length of modular jack 20. Between openings 16 is a divider wall 22. Divider wall 22 separates the openings 16 into a pair of openings or apertures. In a preferred embodiment, each opening 16 receives and holds two modular jacks 20.

Along the walls 23a and 23b which define the length of opening 16 are attachment means 18. Attachment means 18 hold modular jack 20 to modular jack yoke 10. Attachment means 18 are comprised of a plurality of spaced resilient, cantilevered hooks 24 and stops 26. The attachment means required to hold a single modular jack 20 onto yoke 10 will now be described. On wall 23a are two spaced stops 26a and one hook 24a. Hook 24a is located between stops 26a and is apced back from stops 26a. Stops 26a have one face flush with the front face 28 of body 12. Each stop 26a comprises a rectangular protrusion which extends perpendicularly to and downwardly from yoke front face 28. Stops 26a have a length which is somewhat longer than the length of hook 24a. Stops 26a are separated at a distance which is slightly wider than the width of hook 24a and narrower than the width of modular jack 20.

Hook 24a is centrally located between stops 26a and extends perpendicularly from the backside of yoke face 28. Hook 24a is a single piece with two distinct segments, a body 29 and a head 32. The interior wall 30 of body 29 is flush with the inside of wall 23a. Head 32 rests on body 29. Head 32 has a triangular profile; the base of the triangle extending inwardly from interior wall 30 to define hook face 34. A gap 37 is defined by the space between hook face 34 and stops 26a. It will be appreciated that gaps 37 are provided for mold simplicity. They do not serve any function other than manufacturing ease (elimination of mechanical side pulls, cams) in the mold. Yoke 10 would function as well if gaps 37 were bridged between stops 26a and lips 36.

On opposed wall 23b is stop 26b which is spaced from yoke face 28 and is in facing relation with hook 24a. A lip 36 is flush with face 28 and runs along wall 23b. Lip 36 is interrupted by gap 37 formed between stop 26b and lip 36.

Terminal block mounting means 14 are located at both ends of yoke 10. Preferably, mounting means 14 comprises a plurality of counter sunk slots 38. The narrow offset section of slot 38 has a width dimension which will allow the body, but not the head, of a screw or other similar threaded fastener to pass therethrough. The wider section of slot 38 has a depth and dimension which will allow a screw head or other fastener head to pass. Panel mounting means 15 is provided to mount yoke 10 to a panel if preferred. Mounting means 15 are located between slots 38. Mounting means 15 are circular in geometry and pass completely through the body of yoke 10.

Preferably, yoke 10 is manufactured of a flame retardant molded polymer.

Modular jacks 20 have a well known construction including stops 40a and 40b on the opposed top and bottom surfaces thereof which enable the modular jack 20 to be snapped onto yoke 10. During installation, stop 40b fits between gap 37 created by stop 26b and lip 36. Stops 40a comprise three pieces which together form a U-shaped arrangement wherein the lowest stop 40a fits between hook 24a and stops 26a, and the side stops 40a are fit snugly on both sides of stops 26a. This arrangment prevents both lateral and vertical movement of modular jack 20 while in place on yoke 10.

Modular jack 20 enters yoke 10 from the rearward surface. Stop 40b on jack 20 is angularly placed between stop 26b and lip 36. When in place, jack 20 is slid rotationalby over hook 24a until jack stop 40a reaches yoke stop 26a. Jack stop 40a is thenlocked between hook face 34 and yoke stop 26a. Once snap locked in place, jack 20 cannot move vertically or laterally. The placement of jack 20 into yoke 10 described above is preferably a hand operation which requires no special tools, although it may be an automated process.

Once all of the jacks 20 are in place on yoke 10, yoke 10 is mounted to terminal block bracket 19. Terminal block bracket 19 has openings on its wall which correspond to openings 38 of mounting means 14 on yoke 10. Yoke 10 is positioned in an open space on bracket 19. Thereafter, fastening slots 38 are positioned over mounting holes located on bracket 19. Fasteners are inserted into slots 38 and tightened, causing yoke 10 to be mounted to bracket 19. Support tabs 45 extend upward to rest on lower sidewall of block 19 thereby defining a plurality of open slots 46 through which wires for each corresponding jack may pass for the purpose of electrically connecting jacks 20 to block terminals 48 without wrapped wire tails.

Yoke 10 offers many advantages to the manufacturer and field service technicians. Modular jacks 20 are quickly and easily snapped into place on yoke 10. In addition, Yoke 10 and jacks 20 are a single unit which can be readily mounted to a terminal block 18 and bracket 19 or panel with the turn of a few screws. Yoke 10 is designed to fit a modular jack 20 which can incorporate an industry standard 2, 4, 6 or 8 position jack or other connector design with no dimensional changes in the housing. This saves on inventory costs requiring only one yoke for a number of product designs. In the field, the service repairman can add modular jacks to the terminal block quite conveniently; requiring only the attachment of a single piece in contrast to the two piece construction of the prior art. Finally, overall assembly time is decreased because the unit of this invention can be snapped locked together.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A modular telecommunications jack yoke, comprising:

a unitary body, said body including a front face;

at least one rectangular opening in said body for receiving at least one modular telecommunications jack, said opening having opposed first and second sides;

a first stop extending from the first side into the opening;

a resilient, cantilevered hook extending from the first side and spaced back from the first stop, said first stop and hook cooperating with said modular telecommunications jack to affect locking of said modular telecommunications jack within said opening; and mounting means for mounting said body to a support.

2. The claim 1, wherein the mounting means comprises:
a plurality of spaced openings through the body for receiving fastening means.

3. The yoke of claim 1, wherein the body comprises a molded plastic.

4. The yoke of claim 1, wherein the hook comprises a head segment for gripping the modular telecommunications jack; and
a body segment connecting the first side of the unitary body and the head segment.

5. The yoke of claim 1, further comprising:
lip means extending from the second side in facing relation to said stop; and
a second stop extending from the second side in facing relation to said hook and spaced back from said lip means.

6. The yoke of claim 4, wherein the first stop and the lip means coterminate with the front face of the body.

7. The yoke of claim 4, further comprising:
a gap formed in the lip means across from the second stop.

8. A modular telecommunication jack yoke, comprising:
a unitary body, said body including a front face;
at least one rectangular opening in said body for receiving at least one modular telecommunication jack, said opening having opposed first and second longitudinal sides;
a pair of spaced apart first stops extending from the first longitudinal side;
a hook extending from the first longitudinal side, said hook being located between said pair of first stops and being spaced back from said first stops;
lip means extending from said second longitudinal side in facing relation to said pair of first stops; and
a second stop extending from the second longitudinal side in facing relation to said hook and spaced back from said lip means.

9. The yoke of claim 8, wherein the first stops and the lip means coterminate with the front face of the body.

10. The yoke of claim 8, further comprising:
a gap formed in said lip means across from said second stop.

* * * * *